UNITED STATES PATENT OFFICE 2,285,610

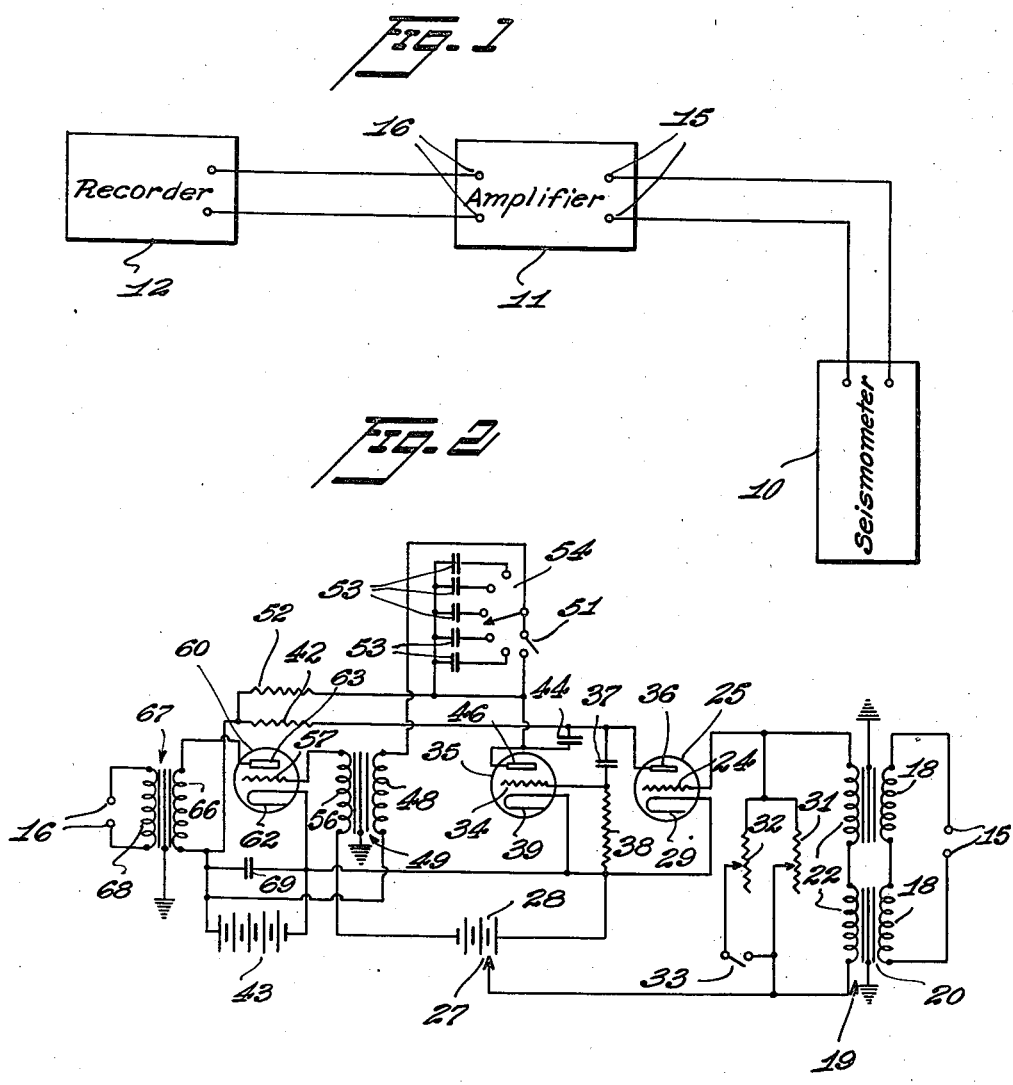

METHOD OF AND APPARATUS FOR SEISMIC SURVEYING

Olive S. Petty, San Antonio, Tex.

Application August 1, 1940, Serial No. 349,315

4 Claims. (Cl. 177—352)

This invention relates to methods of and apparatus for conducting seismic surveys for use in connection with geophysical prospecting, and more particularly to apparatus and methods for amplifying and recording the seismic wave trains which have been generated by firing a charge of explosive at a remote point.

Conventional equipment for recording seismic waves includes a device variously called a detector, seismograph, seismometer, geophone, or the like, which is located at a suitable receiving point. In general, these devices comprise a relatively steady mass and a part movable with the earth, these parts supporting electrical elements which are relatively movable thereby, so that electrical wave-form signals are generated on the arrival of seismic waves or impulses at the receiving station. The electrical wave-form energy, which is representative of the received seismic wave trains, is customarily amplified with suitable equipment and fed into a recorder, which usually includes the moving element of a galvanometer, the motion of which is recorded, by suitable optical means, on a sensitized sheet caused to move by clockwork at a substantially fixed rate. Definite time intervals from an appropriate timing device are also recorded on the sheet.

In order to make use of records prepared in this manner, it is essential to determine accurately the time of explosion of the generating charge as well as the instant of arrival of the first wave of each train of seismic impulses, so that the time of travel of the wave trains may be definitely computed. It is especially important to determine the time of travel of the so-called reflected waves, which penetrate the earth to considerable depths and are reflected upwardly from various strata, in order that the depth of these strata may be calculated.

It is therefore the principal object of the invention to provide methods and means whereby the times of arrival of wave trains may be more definitely determined and accurately located on seismic record sheets of the character described. With this end in view, it is proposed to exaggerate or distort the record slightly, particularly with reference to the more significant features of the record.

In the preferred method of carrying the invention into effect, the exaggeration or distortion of the waves is obtained by a process of electrical differentiation. More specifically, the invention contemplates the differentiation or taking of a derivative with respect to time of the electrical wave-form signals into which the seismic energy is converted by the seismometer, whereby the ultimate record will be more nearly representative of the rate of change of seismic energy rather than of the absolute instantaneous value of such energy.

A more specific object of the invention is to provide, in an amplifier for electrical wave-form signals representative of seismic energy, an electrical circuit to which the signals are applied for the purpose of differentiating or taking a time derivative thereof, together with suitable amplifying and recording means for the signals. The step of differentiating the wave-form signal energy may be performed either before or after amplification of the output of the seismometer.

One advantage of the instant invention resides in the fact that energy having a fairly sharply sloping wave front, for example the usual time break signal, is exaggerated or deformed to a greater extent than energy having a less steep wave front. Again, the effect of differentiating the signal energy is more pronounced as regards the reflected waves, which have a relatively high frequency, than as regards other and less important wave trains of substantially lower frequency.

A further object of the invention is to provide means affording increased amplification of certain desired frequencies so as to minimize wave energy falling outside of the desired frequency band. It is further proposed to provide means, such as a capacitive coupling in one of the amplifying stages which serves to emphasize the frequencies which are characteristic of the reflected wave energy.

Further objects and features of the invention will be apparent from the following description taken in connection with the accompanying drawing, in which Figure 1 is a diagrammatic representation of the essential elements of conventional seismic apparatus; and Figure 2 is a diagram of one form of circuit which may be employed in the amplifying unit of the seismic apparatus shown in Figure 1.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct are contemplated as part of the present invention.

Turning now to Figure 1, it will be observed that the conventional elements of apparatus for the reception and recording of seismic waves are shown, these elements including a seismometer 10, an amplifier 11, and a recorder 12. Following the generation of seismic impulses by the firing of a charge of explosive, the resulting seismic wave trains are received at the seismometer and are there converted into electrical wave-form energy. This wave-form energy is delivered to the input terminals 15 of the amplifier 11, and the amplified energy, applied to the output terminals 16 of the amplifier, is then delivered to the recorder 12. The association of the several illustrated units of the apparatus is conventional, and the nature of each of these units may vary widely. For example, the seismometer may be constructed as disclosed in either of my prior applications Serial No. 324,013, filed March 14, 1940, or Serial No. 318,739, filed February 13, 1940. The amplifying unit may be constructed largely along conventional lines, and may comprise one or more thermionic valve amplifying circuits. The recorder may include a string or moving coil galvanometer, the displacement of the movable element being proportional to the current flowing therein. Conventional recording means, including a timing device for the recording of time intervals, is associated with the galvanometer.

In the practice of the instant invention, the amplifier is preferably modified to effect the desired differentiation of the signal energy and may be constructed as shown more particularly in Figure 2. Thus the incoming energy applied at the terminals 15 is supplied to the primary windings 18 of a transformer indicated generally at 19, the transformer core 20 being grounded. The secondary windings 22 of the transformer supply a varying potential to the grid 24 of a thermionic valve 25. A suitable bias voltage is applied to the grid 24 by an adjustable tap 27 on a source 28 of grid bias voltage, the positive terminal of the source being connected to the cathode 29 of the valve 25 and the negative tap being returned to the grid through the transformer secondary. Variable resistances 31 and 32, the latter being arranged in series with a switch 33, are shunted across the secondary windings 22 of the transformer 19 for the purpose of regulating the amplitude of energy supplied to the valve 25.

The output of the valve 25 is delivered through resistance coupling to the valve 35. Thus the anode 36 of the valve 25 is connected to the grid 34 of the valve 35 through a coupling condenser 37, a grid resistor 38 being connected between the grid 34 and the cathode 39 of the valve 35, and an anode resistor 42 being connected between the anode 36 of the valve 25 and the positive terminal of a source 43 of anode voltage, the negative terminal of the source 43 being returned to the cathodes 29 and 39.

At this point the desired step of differentiating the wave-form energy is preferably effected. Generally stated, the impedance of the condenser 37 is either of the order of the impedance of the resistor 38 or of a greater order. Otherwise expressed, the voltage drop across the condenser 37 is greater than across the resistance 38, the relationship being such that approximately a time derivative is taken at this point, the voltage applied to the grid 34 being more nearly representative of the rate of change of incoming signal energy than the absolute value of this energy.

It is of course necessary to take into consideration, in determining the value of the coupling condenser 37, not only the value of the resistor 38 but the sum of this resistance and the resistance of the plate load in parallel with the internal plate resistance of the valve 25. For example, I have successfully employed a circuit of the type described having a valve 25 of approximately 100,000 ohms plate resistance, an anode resistor 42 of 250,000 ohms, a grid resistor 38 of 250,000 ohms, and a coupling condenser 37 of from .01 to .04 mfd.

For the purpose of emphasizing energy within the desired frequency band, the anode circuits of the valves 25 and 35 may be coupled by a condenser 44 of relatively small capacity, whereby only frequencies higher than the desired band are fed back from the anode 46 of the valve 35 in inverse phase relation, the higher frequency energy being thus largely cancelled.

The output of the anode 46 of the valve 35 may be returned through the primary winding 48 of transformer 49, the core of which is grounded, to the positive terminal of the anode source 43, by the closing of a switch 51 arranged in series with these elements. However, it is sometimes desirable to emphasize certain frequencies, for example the frequencies characteristic of reflected wave energy, and for this purpose I prefer to provide a variable capacitive coupling between the valve 35 and the transformer 49. Thus the switch 51 may be opened, anode voltage being supplied to the anode 46 of the valve 35 through an anode resistor 52. A series of coupling condensers 53 of different capacity are arranged for selective coupling between the anode 46 and the primary 48 of the transformer 49 by a switch 54. By selection of the proper coupling condenser 53, a particularly useful range of frequencies within the desired frequency band may be favored, and this is quite important in order that high frequency wind disturbances and the like may not be rendered unduly prominent in the record.

Thus in practice, while reduction of the capacity of the coupling condenser 37 below the range of values hereinbefore set forth will cause the output of the resistance coupled stage to approach more nearly a true derivative of the original wave, it is frequently desirable to effect a compromise so as to avoid undue increase in gain at undesired high frequencies with relation to the gain within the desired range of frequencies.

It is also important to note that the amplifying stage employing the coupling condensers 53 and the transformer 49 may in itself be employed for the purpose of taking a further derivative of the output of the resistance coupled circuit by suitable selection of values, and the effect of such a circuit is in certain respects even more satisfactory than the resistance coupled stage. Thus it can be shown that in order to take a true mathematical derivative of a wave-form signal, the phase relation must be distorted by 90°, and it can further be shown that whereas in a resistance coupled stage phase distortion results in undesirable frequency distortion, a stage employing a coupling condenser and an interstage transformer such as that described may be so adjusted that phase distortion may be effected independently of frequency distortion, with the result that compromise values, tending to lessen the gain at high frequencies, need not be employed.

For example, with an inductance of 70 henries in winding 48, the requisite 90° phase shift may be obtained at 60 cycles by using a .1 mfd. condenser at 53, and the desired frequency response of this circuit may be independently adjusted as desired by varying the value of resistor 52 between 10,000 and 50,000 ohms. When a resistor of 50,000 ohms is employed, the output of transformer 49 will closely approximate a mathematical derivative in frequency distortion as well as phase distortion for a range of frequencies in the neighborhood of 60 cycles. By employing a resistor of 20,000 ohms or less, the phase distortion of a mathematical derivative may be introduced without the frequency distortion, and a magnitude of 60 cycle signals will be emphasized with respect to higher frequencies.

The secondary winding 56 of the transformer 49 is connected at one end to the grid 57 of a thermionic valve 60, the other end of the winding being connected to the negative terminal of the source 28 of grid bias voltage. The cathode 62 of the vlave 60 is connected to the negative terminal of the source 43 of anode voltage, the positive terminal of the source being connected to the anode 63 of the valve through the primary winding 66 of a transformer 67, the core of which is grounded. The secondary winding 68 of the transformer 67 delivers the entrgy to the output terminals 16 of the amplifier, either directly or through further amplifying stages, and thence to the recorder 12 as shown in Figure 1. The source 43 of anode voltage for the several valves is shunted by a condenser 69 affording a by-pass for pulsating current.

It will be appreciated that the instant invention contemplates the electrical derivation with respect to time of the signal energy from a seismometer and the recording of the differentiated signal thus obtained either with or without further amplification or other treatment. The invention also contemplates the use, preferably in conjunction with a signal differentiating circuit, of further means for discriminating in favor of certain desired frequencies and of means for taking further or higher orders of derivative. It will be understood, however, that these various features may be employed either separately or together as desired, within the limits defined by the claims anexed hereto. Thus the inverse feed back coupling afforded by the condenser 44 may be eliminated without appreciable effect on signals falling within the desired frequency range. Again, by closing the switch 51 and opening the switch 54, the effect of the coupling condensers 53 is eliminated and the circuit may function, with the exception of the differentiation of the signal in the resistance coupled stage, as a conventional amplifier.

Having thus described the invention, what is claimed as new and desired to be secured by Letters Patent is:

1. In apparatus for use in seismic surveying, the combination with means for converting seismic impulses into electrical wave-form energy, of means including a plurality of thermionic valve circuits for amplifying said wave-form energy, one of said circuits having associated therewith means for obtaining a derivative of said energy, an interstage transformer between adjacent circuits, means for selectively establishing a direct or a capacitive coupling between the transformer and the preceding one of said adjacent circuits, and means for recording the energy thus differentiated to produce a record generally representative of a derivative of the initial wave-form energy.

2. In apparatus for use in seismic surveying, the combination with means for converting seismic impulses into electrical wave-form energy, of means including a plurality of thermionic valve circuits for amplifying said wave-form energy, an interstage transformer between adjacent circuits, and means for selectively establishing a direct or a capacitive coupling between the transformer and the preceding one of said adjacent circuits.

3. In apparatus for use in seismic surveying, the combination with means for converting seismic impulses into electrical wave-form energy, of means including a plurality of thermionic valve circuits for amplifying said wave-form energy, an interstage transformer between adjacent circuits, means for selectively establishing a direct or a capacitive coupling between the transformer and the preceding one of said adjacent circuits, and means for so varying the value of said capacitive coupling that a true mathematical derivative at a desired frequency is obtained.

4. In apparatus for use in seismic surveying, the combination with means for converting seismic impulses into electrical wave-form energy, of means including a plurality of thermionic valve circuits for amplifying said wave-form energy, one of said circuits having associated therewith means for obtaining a derivative of said energy, said last named means including an interstage transformer between adjacent circuits, and means establishing a capacitive coupling between the transformer and the preceding one of said adjacent circuits, and means for recording the energy thus obtained to produce a record generally representative of a derivative of the initial wave-form energy.

OLIVE S. PETTY.